United States Patent
Caci

(10) Patent No.: US 7,224,985 B2
(45) Date of Patent: May 29, 2007

(54) ANTENNA SEGMENT SYSTEM

(75) Inventor: J. Claude Caci, Owego, NY (US)

(73) Assignee: Lockheed Martin, Corp., Bethesda, MD (US)

( * ) Notice: Subject to any disclaimer, the term of this patent is extended or adjusted under 35 U.S.C. 154(b) by 567 days.

(21) Appl. No.: 10/345,283

(22) Filed: Jan. 16, 2003

(65) Prior Publication Data

US 2004/0204112 A1    Oct. 14, 2004

(51) Int. Cl.
*H04Q 7/20*    (2006.01)
(52) U.S. Cl. .................... 455/456.1; 455/432.1
(58) Field of Classification Search ............ 455/456.1, 455/456.2, 404.2, 3.02, 432.1, 457, 440, 455/448, 433, 414.2; 343/795, 807; 370/313, 370/208
See application file for complete search history.

(56) References Cited

U.S. PATENT DOCUMENTS

| | | | |
|---|---|---|---|
| 4,688,026 A | 8/1987 | Scribner et al. | |
| 4,937,863 A | 6/1990 | Robert et al. | 380/4 |
| 5,438,508 A | 8/1995 | Wyman | 364/401 |
| 5,485,634 A | 1/1996 | Weiser et al. | |
| 5,745,879 A | 4/1998 | Wyman | 705/1 |
| 5,812,086 A | 9/1998 | Bertiger et al. | |
| 5,917,425 A | 6/1999 | Crimmins et al. | |
| 5,936,572 A | 8/1999 | Loomis et al. | |
| 5,977,913 A | 11/1999 | Christ | |
| 5,987,380 A | 11/1999 | Backman et al. | |
| 6,006,021 A | 12/1999 | Tognazzini | |
| 6,032,020 A | 2/2000 | Cook et al. | |
| 6,078,823 A | 6/2000 | Chavez et al. | |
| 6,101,607 A | 8/2000 | Bachand et al. | 713/201 |
| 6,208,311 B1 * | 3/2001 | Reece et al. | 343/795 |
| 6,285,321 B1 | 9/2001 | Stilp et al. | |
| 6,317,599 B1 | 11/2001 | Rappaport et al. | |
| 6,317,604 B1 | 11/2001 | Kovach, Jr. et al. | |
| 6,326,926 B1 | 12/2001 | Shoobridge et al. | |
| 6,340,932 B1 | 1/2002 | Rodgers et al. | |
| 6,369,413 B1 | 4/2002 | Hynecek | |
| 6,369,710 B1 | 4/2002 | Poticny et al. | |
| 6,396,413 B2 | 5/2002 | Hines et al. | |
| 6,396,438 B1 | 5/2002 | Seal | |
| 6,400,320 B1 | 6/2002 | Stilp et al. | |
| 6,415,223 B1 | 7/2002 | Lin et al. | |
| 6,421,027 B1 | 7/2002 | Takatori et al. | |
| 2001/0046870 A1 | 11/2001 | Stilp et al. | |
| 2002/0089450 A1 | 7/2002 | Dowdle et al. | |
| 2002/0094777 A1 | 7/2002 | Cannon et al. | |
| 2003/0216144 A1 * | 11/2003 | Roese et al. | 455/456.1 |

OTHER PUBLICATIONS

Provisional U.S. Appl. No. 60/361,419, A system for network definition based on device location.*

(Continued)

*Primary Examiner*—Edward F. Urban
*Assistant Examiner*—Tu X. Nguyen
(74) *Attorney, Agent, or Firm*—Ronald E. Prass, Jr.; Irving, Prass & Stelacone, LLP

(57) ABSTRACT

Disclosed is an antenna segment system for communicating between fixed antenna segments and wireless mobile devices. The antenna segments may be embedded in lighting fixtures distributed in a building. Each lighting fixture may emanate a visible light pattern related to an antenna pattern of an antenna segment embedded in the respective lighting fixture. The system includes a computer that can automatically assign addresses to the distributed antenna segments based on time domain reflection signals returned over a wire path between a controller and the segments.

18 Claims, 13 Drawing Sheets

OTHER PUBLICATIONS

Information received from the Internet in respect of ChainKey, Inc. "Adaptive Key Patent" on Apr. 7, 2003 at http://members.jcom.home.ne.jp/chainkey/pateab.htm.

Information obtained from the Internet in respect of PC Guard for Win 32 "Software Protection and Licensing System" on Apr. 7, 2003 at http://www.sofpro.com/e_pcgw32.htm.

Information obtained from the Internet in respect of Sampson Multimedia "Crypto++ SDK Software Copy Protection" on Apr. 7, 2003 at http://www.sampson-multimedia.com/howdoes.html.

Information obtained from the Internet in respect of "Crypkey" on Apr. 7, 2003 at http://www.crypkey.com/products/addinfo/howdoes/howmain.html.

Information obtained from the Internet in respect of "SlockPK" on Apr. 7, 2003 at http://www.crypto-central.com/slock/index.html.

Information obtained from the Internet in respect of "Softwarckey Software Licensing E-Commerce System" on Apr. 7, 2003 at http://www.softwarekey.com/.

Information obtained from the Internet in respect of "Software Activation Service" on Apr. 7, 2003 at http://www.activatesoft.net/technology.asn.

Technical Market Bulletin in respect of "Microsoft Product Activation for Windows XP" dated Aug. 2001.

* cited by examiner

Hotel Floor Plan Layout with Antenna Segments

Auto Configuration Method

ANTENNA SEGMENT SYSTEM

In certain communication systems, it is desirable to correlate accurately the location of a mobile unit with fixed locations.

In one exemplary embodiment of the present invention, a communications system locates a user equipped with a mobile unit (such as, e.g., a PDA, cell phone, or laptop computer) by coupling a plurality of antenna segments to an antenna controller using cabling. The antenna controller provides a radio frequency (RF) carrier signal that is propagated down to all of the antenna segments. The antenna segments contain electronics for communication with the antenna controller, as well as with other antenna segments. Each of the antenna segments has a precise location (or physical address) and antenna pattern, such that when a communicating mobile unit is in the vicinity of a particular antenna segment, the exact location of the mobile unit can be determined by a central computer that interfaces with the antenna controller.

The communications system is especially useful in large building spaces, such as large square footage convention centers, hotels, shopping malls, merchant's retail space, military bases, theme parks, high rise buildings, and large department stores. The communications system is also useful in outdoor areas along walkways that connect buildings and parking lots. Thus, large numbers of antenna segments can line the hallways of hotels, convention centers, museums, universities and similar structures. Likewise, the antenna segments can be embedded along product shelving in a merchant's retail space. They can be used indoors and outdoors.

In one embodiment of the present invention, an antenna segment is embedded in a light fixture. Metal components of the light fixture may help direct electronic communication waveforms between an embedded antenna segment and a mobile unit. The volume of space illuminated by the light fixture may define or otherwise relate to a volume of space served by an antenna segment embedded in the fixture, providing a visual cue to a user associated with a mobile unit.

DETAILED DESCRIPTION

Figure 1:
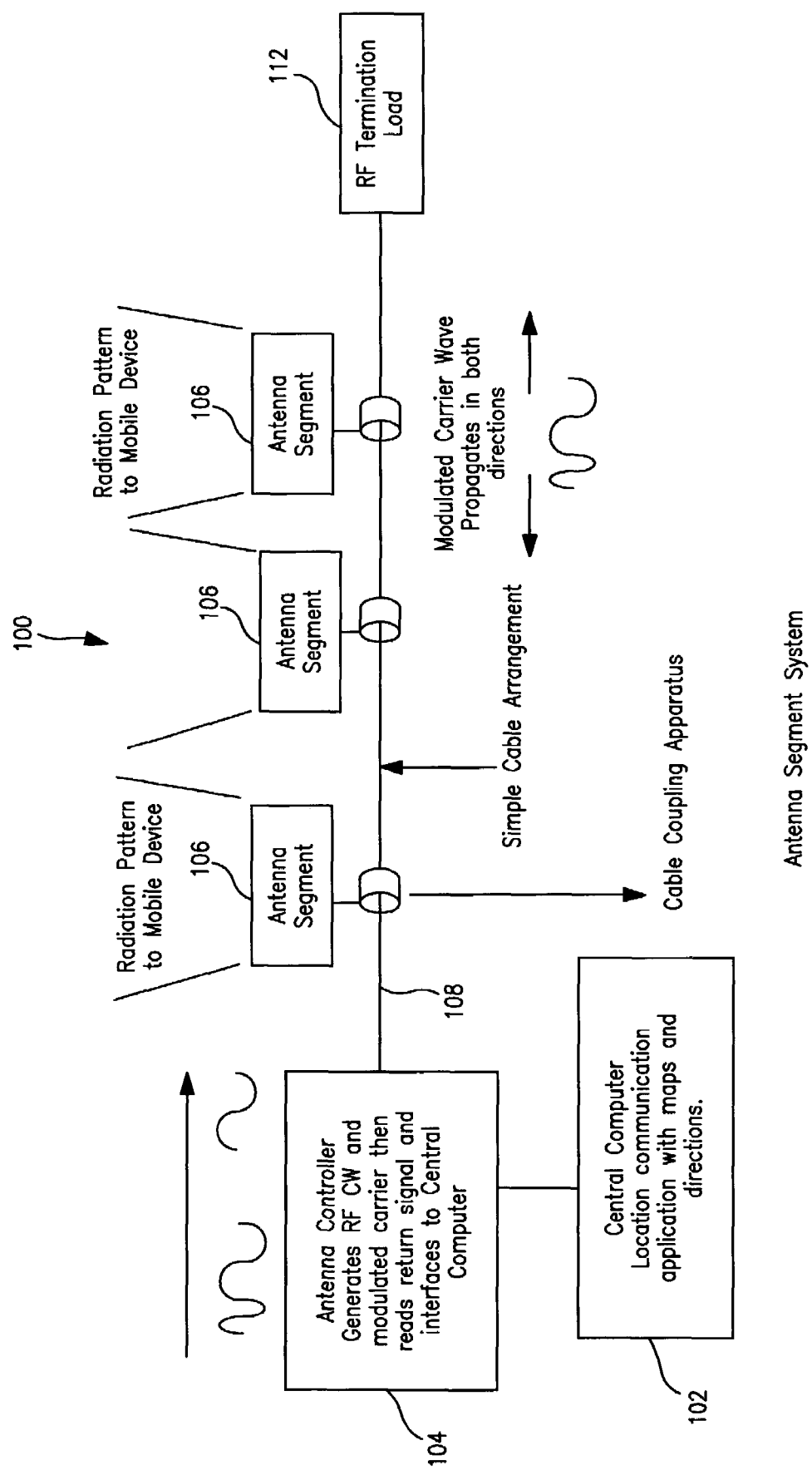
FIG. 1 is a high-level block diagram of a mobile device locating system constructed in accordance with one exemplary embodiment of the present inventions.

Referring to FIG. 1, an exemplary embodiment of a mobile device locating system 100 is described. The communications system 100 generally comprises a central computer 102, one or more antenna controllers 104 (only one illustrated) coupled to the central computer 102, and a plurality of antenna segments 106 (three illustrated) coupled to each of the antenna controllers 104 via a cabling 108. The system 100 is designed to overcome the distance limitations of LAN-based cable systems, such as Ethernet, Fast Ethernet and Gigabit Ethernet, which are limited to some 100 meter cable lengths to ensure round trip timing specifications are met. Thus, the communications system 100 is capable of running very long lengths of cabling 108 free from electrical and protocol limited constraints. The length of the cabling 108 is only limited by the strength and quality of the RF signal required at the last antenna segment 106.

The antenna segments 106 are designed to generate a particular radio frequency (RF) field distribution shape to cover a particular three-dimensional space, such as, e.g., a hotel hallway or a merchant's product shelving section. Once a mobile wireless unit 110 enters the field distribution pattern of a particular antenna segment, this information is conveyed to the central computer 102 via the antenna controller 104. The central computer 102 can then determine the exact location of the wireless unit 110 in the context of the environment in which the antenna segments 106 have been distributed. The antenna segments 106 are designed to be simple not requiring any configuration to set up. Upon physical installation of antenna segments 106, antenna controller 104 can start communication with antenna segments 106 immediately.

To demonstrate a possible use, consider the case of a complex hallway where there are many interconnecting hallways, such as those found in a large hotel or a convention complex. A user with a wireless unit 110, such as a PDA, wishes to get directions while proceeding down the hallway. Since the PDA screen is small, the central computer 102 can read the mobile location and provide the appropriate map segment, allowing the user to continuously navigate the space and changing the map as the space is traversed. Another possible use is a merchant's retail space. The antenna segments 106 make it possible to guide a consumer along large complex product shelving systems in a large volume retail space to quickly locate a single item.

In one embodiment, each antenna segment may be embedded into a different light fixture. In that case, the antenna segments may be added to existing light fixtures by electricians.

A user may be provided with visual cues. For example, a user may be instructed to associate a light radiation pattern emanating from a light fixture with a radio frequency radiation pattern emanating from an antenna segment embedded in the light fixture. The location of an antenna segment or its radiation pattern may be marked with indicia, such as for example an LED. Having been provided an observable cue related to a fixed location, the user can more accurately correlate the exact location of a mobile device in communication with the antenna segment.

The metallic elements of a lighting fixture can be used to direct an RF pattern from an antenna segment as desired. In this manner, interference between adjacent antenna segments can be controlled. Further, such control is provided by adjusting the power level provided to individual antenna segments.

Figure 2:
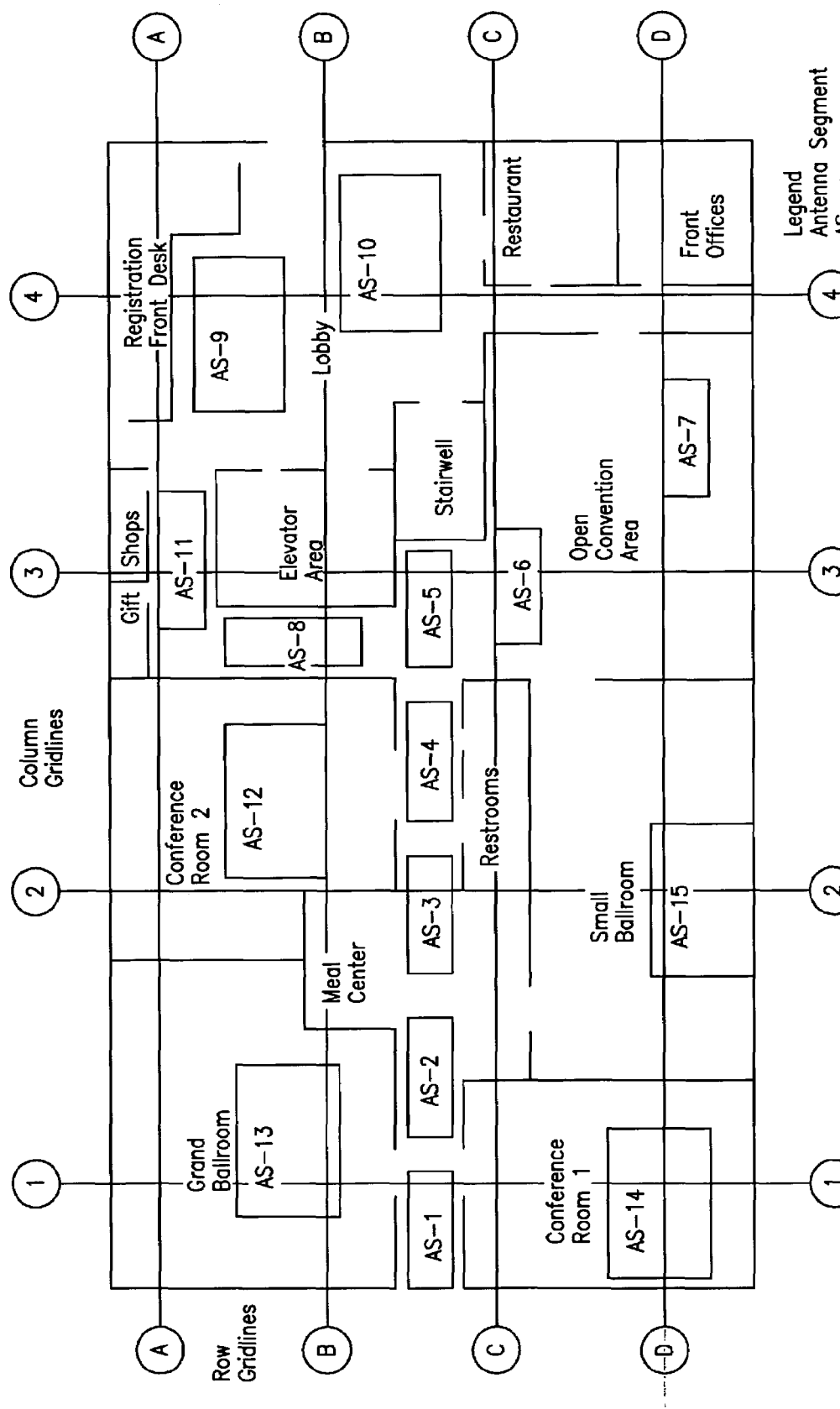
FIG. 2 is an exemplary hotel floor plan layout with antenna segments used by the system of FIG. 1 to locate a mobile device within the hotel.

Consider FIG. 2, which illustrates an exemplary hotel floor plan layout. Fifteen antenna segments AS-1-to-AS-15 are distributed in the hotel in a row and column grid line format. The row and column may be formatted as part of a database stored within the central computer 102. When a mobile unit 110 moves along the floor, the signals from the antenna segments 106 are matched to the database, so that the central computer 102 can locate the mobile unit 110 in the building space. The central computer 102 can then offer a location menu and map to the user. The menu and maps change as the user navigates the building space. The menu may for example indicate products or services available at the user's particular location as determined by central computer 102.

The antenna controller 104 and antenna segments 106 communicate with each other by modulating a carrier signal that continuously resides on the cabling 108. If the antenna segments 106 use only one frequency, only one antenna segment 106 can modulate the carrier signal at a time. Alternatively, the antenna segments 106 modulate the carrier signal with different frequencies, in which case, they would be able to modulate the carrier signal at the same time. For example, antenna segment AS-1 can modulate at frequency $f_1$, and antenna segment AS-2 can modulate at frequency $f_2$, and so forth. There should be adequate separation between the antenna segment modulation frequencies to account for sum and difference frequencies that will not interfere with each other.

Figure 4:
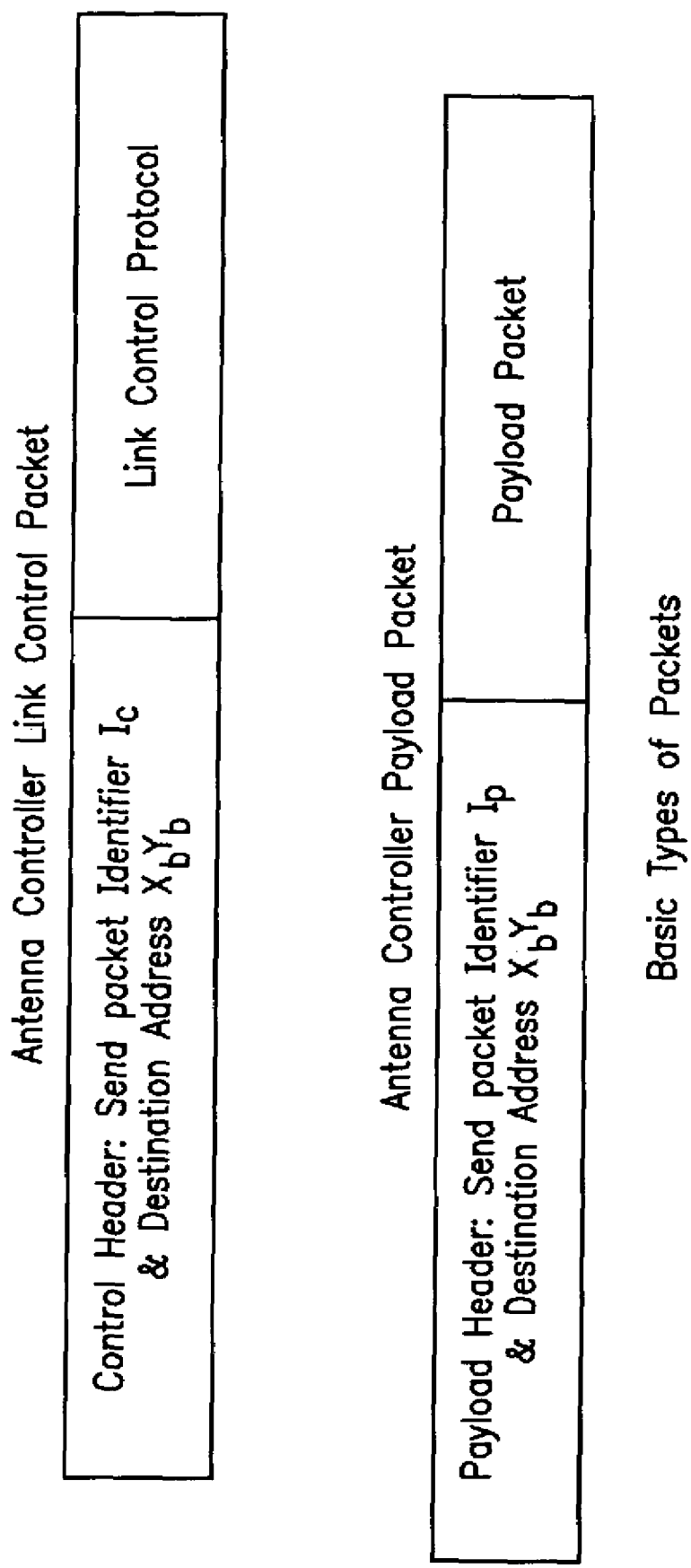
FIG. 4 illustrates the structures of two basic types of data packets transmitted by the antenna controller.

The antenna controller 104 can communicate with and control the antenna segments 106 by modulating the carrier signal with data packets. FIG. 4 illustrates two basic types of data packets that can be transmitted: (1) an antenna controller link control packet and (2) an antenna controller payload packet. The antenna controller link control packet contains control header and a link control protocol, which allows the antenna controller 104 to manage the RF link between the antenna segments 106 and the mobile unit 110. The antenna controller payload packet contains a payload header and a payload packet, which is retransmitted by the antenna segments 106 into their assigned radiation patterns.

Figure 3:
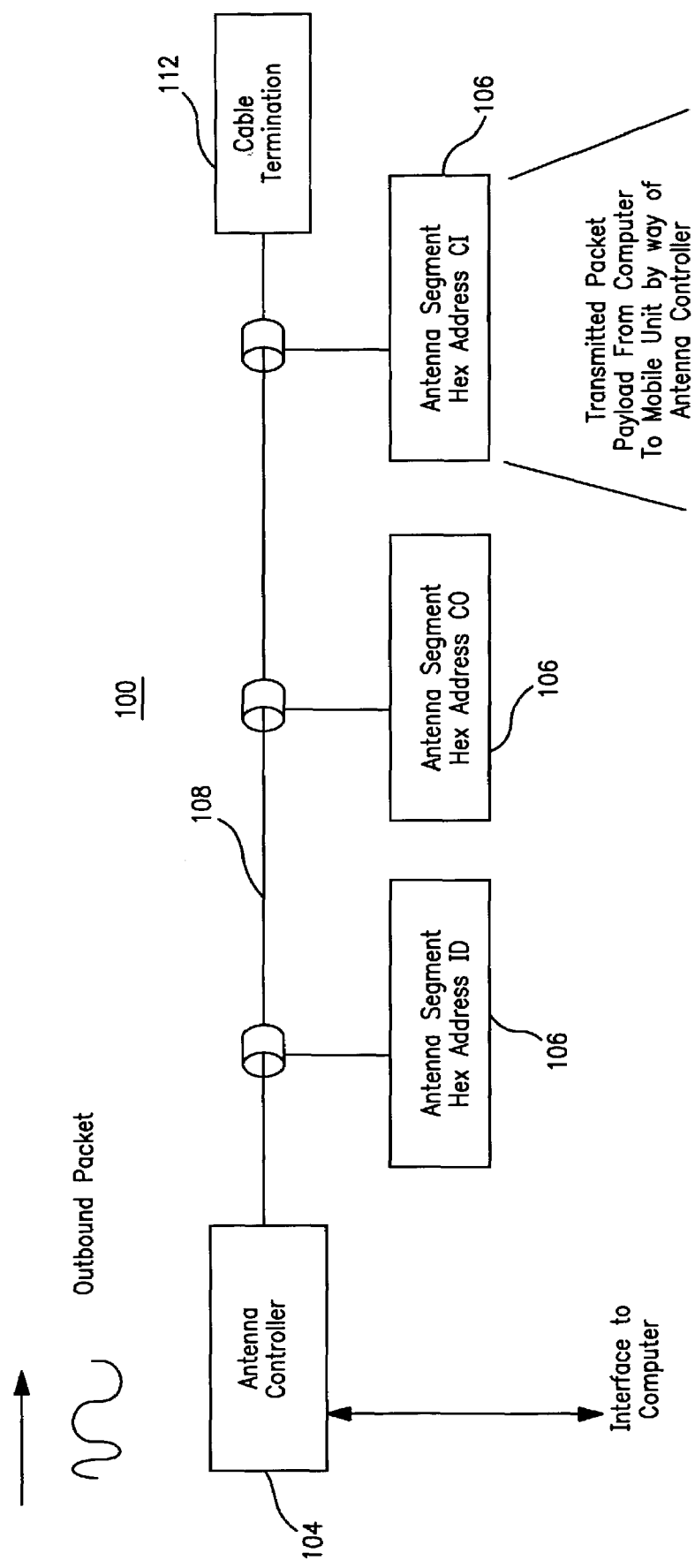
FIG. 3 is a high-level block diagram of the system of FIG. 1, particularly illustrating an outbound data packet from an antenna controller used by the system of FIG. 1.

The control header and payload header both include a send packet identifier, a start code, one or more destination addresses, and a stop bit. The send packet identifier identifies the packet as originating from the antenna controller 104. The destination address corresponds to the logical address of a particular antenna segment 106, and thus is used to control which antenna segment 106 is to receive the link control protocol or payload packet. FIG. 3 illustrates how data packets are sent from the antenna controller 104 to one or more antenna segments 106. The destination address, for example, may be a two digit hexadecimal number. When an antenna segment 106 reads a destination address corresponding to its logical address, it decodes the full data packet, and if it is a payload packet, it strips off the payload header, and retransmits the payload into its assigned radiation pattern.

Because there may be one or more mobile units 110 in a particular antenna segment radiation pattern, and there may be two or more antenna segments 106 in close proximity to one another, it is important that the antenna segment radiation patterns be managed with respect to frequency and power level to avoid interference with other mobile units 110 and other antenna segments 106. The antenna controller 104 can locate each mobile unit 110 as the customers navigate the building spaces or merchant aisle ways. When a mobile unit 110 is within the defined RF radiation pattern of the antenna segment 106, the link is unique to that mobile unit 110, though other antenna segments 106 may also receive the signal. Each antenna segment 106 transmits its ID as part of the RF management protocol for each data packet. In this manner, the antenna controller 104 can track each mobile unit 110 separately. The radiation frequency band is specifically chosen, so that the antenna controller 104 can manage the antenna segment's gain for highly directional precise RF volume communications. Since another antenna segment 106 may be only a few feet away, the antenna controller 104 must rely on the antenna segment pattern gain to manage the link. The pattern is designed to fill a unit of building volume, such as a hallway or aisle-way.

For antenna gain to be effective, the frequency must be high. As an example, a high frequency can be selected, so that the effective link gain of the mobile unit 110 and the antenna segment 106 together is about 12 dB. If the antenna segment 106 can manage a gain of 6 dB, for example, then the total link gain will be the sum of the two, i.e., 12 dB: The antenna controller 104 can then control the link power budget level to maintain a good, but range-limited, link with the mobile unit 110. It will be able to control a handoff between antenna segments 106 as the mobile unit 110 traverses the building space. The formula for the link signal budget is shown by the following equation:

$$C/N_0 = P_t + G_t - L_p + G_r - k; \quad [1]$$

$C/N_0$ is the carrier power to noise ratio, which is a figure of merit to establish a working bit error rate (BER). $P_t$ is the power level at the transmit antenna, $G_t$ is the gain of the transmit antenna, and $G_r$ is the gain of the receiving antenna. $L_p$ is the free space loss, which will be small due to the short propagation distance. $L_p$ must be substantially smaller numerically than the combined $G_t$ and $G_r$. k is a constant related to the frequency. Of all the values in equation [1], the antenna controller 104 has control over only $P_t$, but the high value of both gains and low value of the free space path low works in favor of managing the short-range link by power.

In the antenna segment's RF pattern volume space, the link control protocol within the antenna controller link control packet will convey commands from the antenna controller 104 to the antenna segment 106. The commands convey data to set transmit power level as directed. Equation [1] works in both directions as long as the power level regulation is maintained. The antenna controller 104 manages both sides of the link through the antenna segment 106. The mobile unit 110 maintains precise frequency and power levels as directed by the antenna segment 106. Link power budget parameters are exchanged, and the antenna controller 104 makes computations and issues commands.

Figure 5:
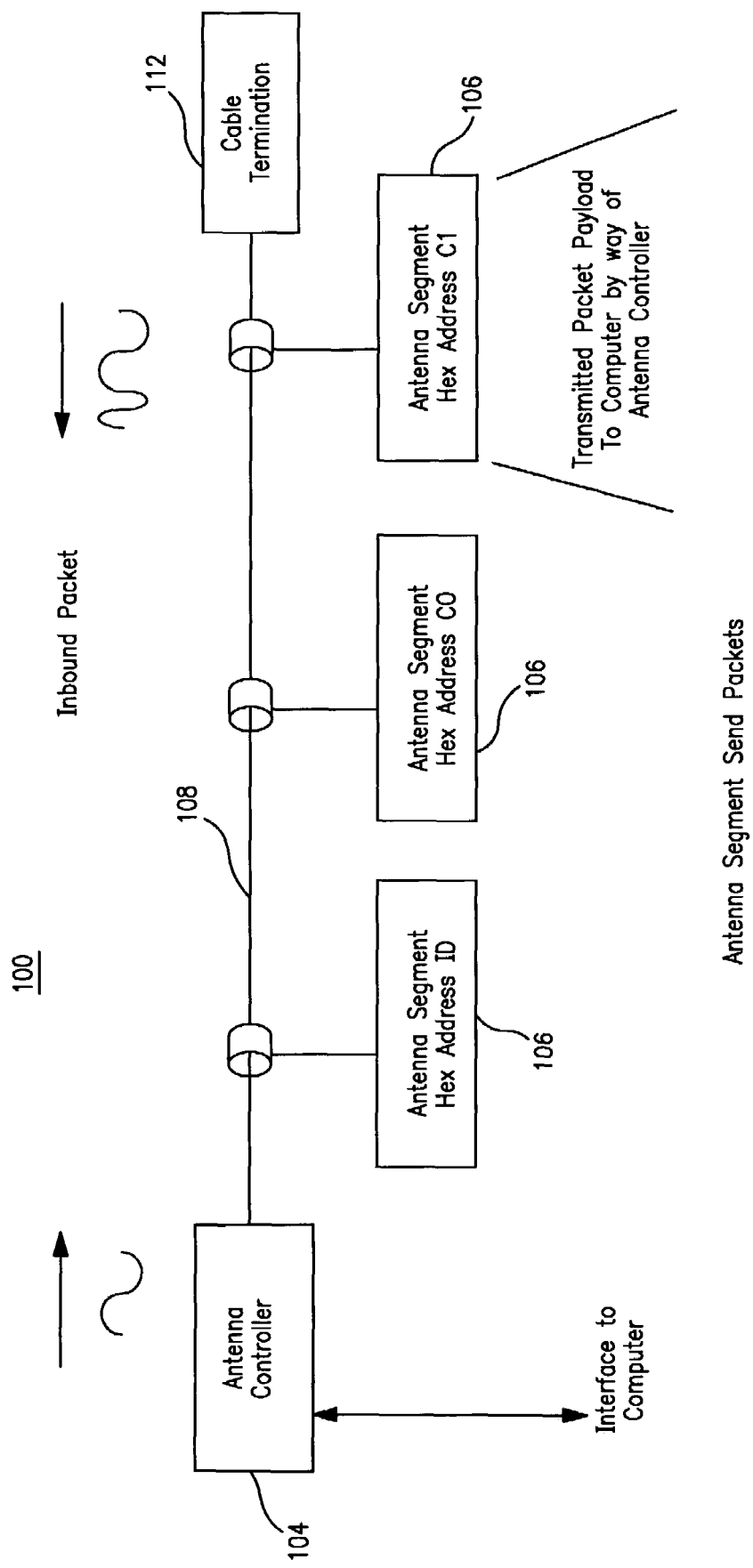
FIG. 5 is a high-level block diagram of the system of FIG. 1, particularly illustrating an incoming data packet from an antenna segment used by the system of FIG. 1.

For example, referring back to FIG. 2, let a mobile unit 110 be on the edge of an RF pattern from antenna segment AS-1, which adjoins antenna segment AS-2. Both antenna segments report the received level back to the antenna controller 104. The antenna controller 104 makes a decision to hand off the mobile unit 110 from one antenna segment 106 to another based on a mathematical algorithm and moving average RSL data. The data is measured by both antenna segments 106 and sent on to the antenna controller 104. FIG. 5 shows a data packet being sent from an antenna segment 106 back to the antenna controller 104.

The system 100 is a cable up and go design, and there is no requirement to work out the network configuration in advance. The antenna controller 104 is mated to the antenna segments 106 without any preconditions. The system 100 does not require data entry, such as antenna segment logical addresses, address masks, or default addresses with names and identification. The intent is to make antenna segment installation as simple as installing a string of fluorescent lights in a hallway. The antenna controller 104 uses time domain reflectometry to identify antenna segments 106.

Figure 6:
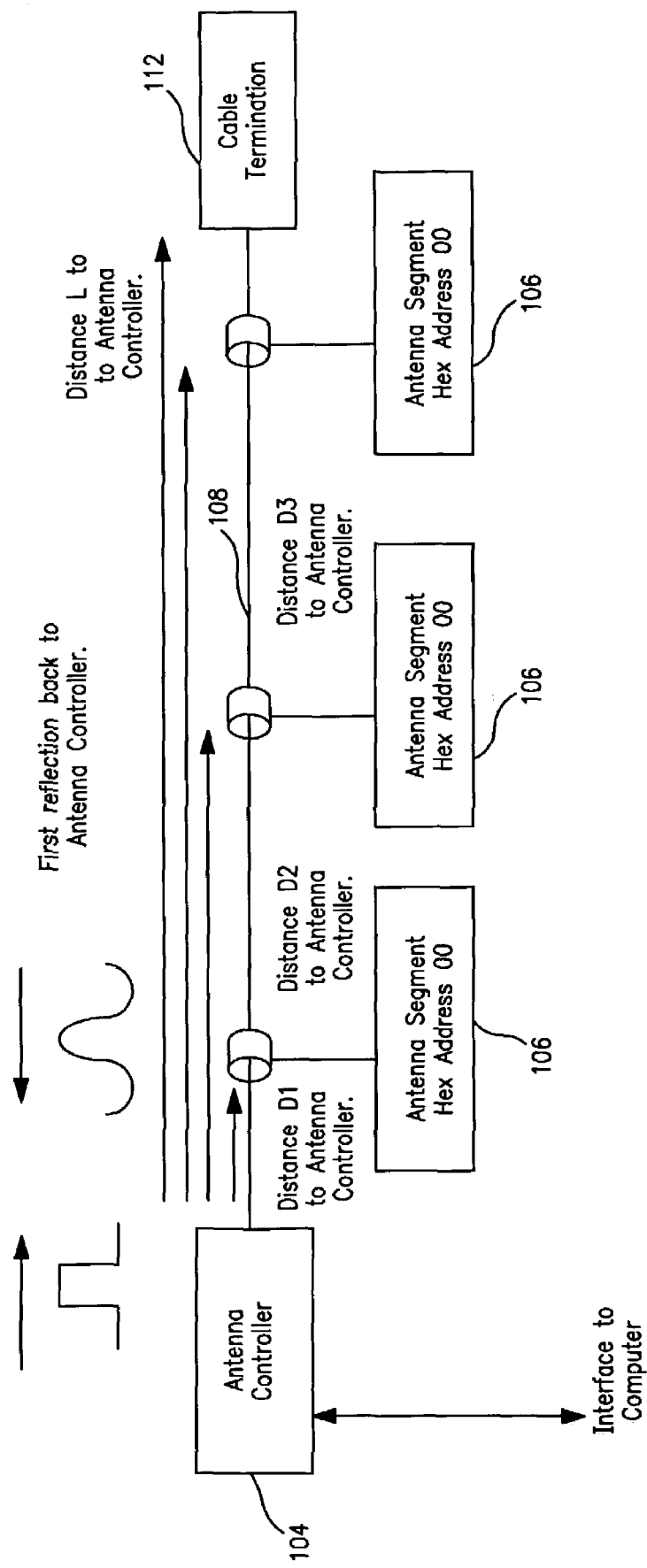
FIG. 6 is a high-level block diagram of the system of FIG. 1, particularly illustrating an auto configuration method used by the system to determine distances between the antenna controller and the respective antenna segments.

FIG. 6 illustrates automatic configuration of system 100. The antenna controller 104 is connected to the central computer 102 and by the cabling 108 to a cable termination 112 some distance away. The antenna segments 106 are distributed along the length of the cabling 108. On initial startup, the antenna segments 106 are silent. The antenna controller 104 sends a suitable shape waveform down the cabling 108. The waveform travels onto the next discontinuity at the first antenna segment 106 creating a reflection, and so on until the wave form reaches the cable termination 112 where the last reflection occurs. The last reflection results from the cable termination 112. The reflection from the cable termination 112 is distinct from the reflections at the antenna segments 106 in that the antenna segments 106 do not electrically connect to the cabling 108, but the cable termination 112 does. Therefore, the antenna segment 106 impedance is a complex number different from the value of a physical real termination. The return time for each reflection is measured by the antenna controller 104 and each distance is computed. This time is then used to create a packet time-to-live parameter that is sent as a data packet.

The first control exchange between the antenna controller 104 and the first physical antenna segment 106 on the cabling 108 is used to set the identification address of the first antenna segment 106. This procedure is repeated for subsequent antenna segments 106 until all are accounted for. Specifically, the time-to-live parameter is used to signal the first antenna segment 106 to communicate with the antenna controller 104. Since the first antenna segment 106 sees the packet first as it propagates down the cabling 108, it sends its signal out first in both directions as shown in FIG. 1. The other antenna segments 106 down the line sense the modulation from the first antenna segment 106 and remain quiet. In this example, cable propagation velocity is expected to be about 20 cm per nanosecond. There should be a minimum of three meters between antenna segments 106 for a time delay of about 15 nanoseconds. The packet velocity of propagation is dependent on the cable dielectric constant. Typical values are between 60% to 85% of free space velocity c (2.99 E+8 meters/second). When the first antenna segment 106 has been set, the process is repeated. During the second iteration, the first antenna segment 106 is silent, because its address has been set. In a sense, the antenna segments 106 are daisy chained down the cabling 108. This procedure is repeated for subsequent antenna segments 106 until the cable length L is reached.

The first powered up logical address of an antenna segment 106 is a predetermined fixed code. For example, it could be set to zero. Zero could also be used to signal a first use only broadcast control message. This number would subsequently be excluded from any addressing use. The first control message, for example, could order all antenna segments 106 to broadcast a reply on receipt of the second time marking packet.

Figure 7:
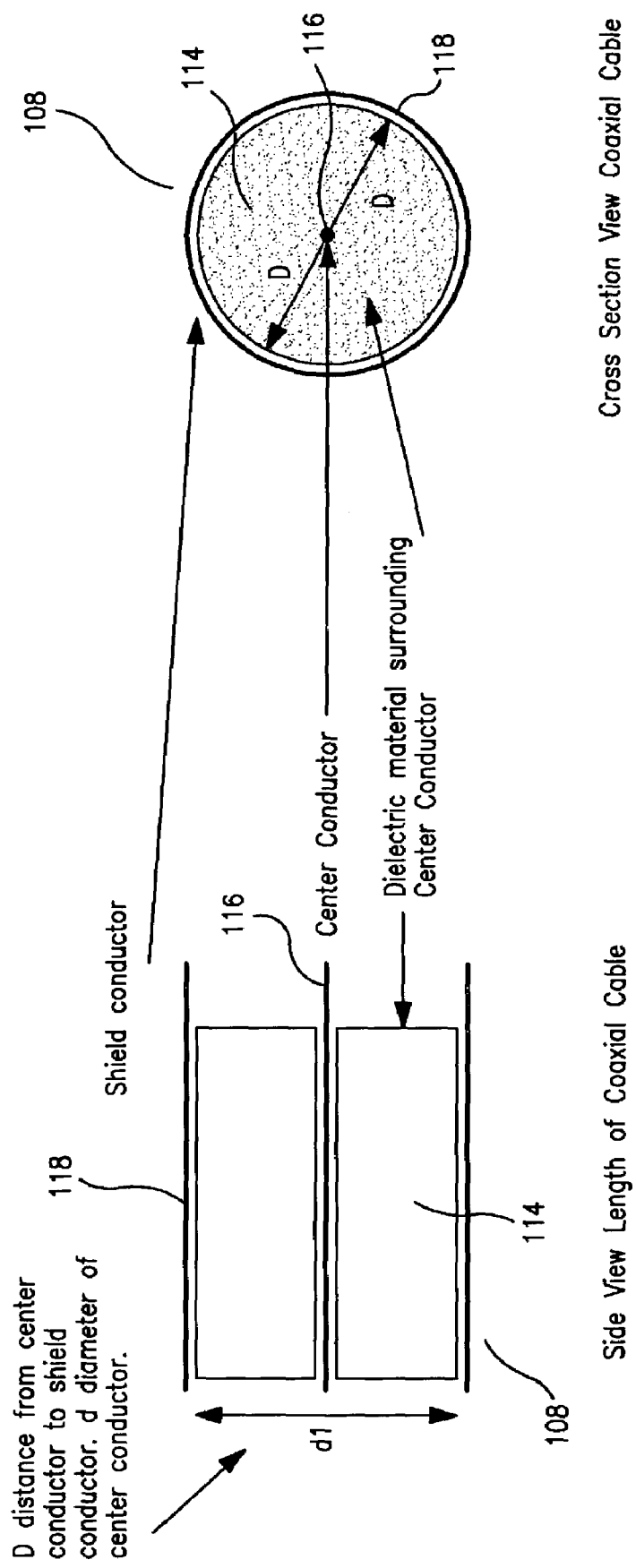
FIG. 7 shows cross-sectional views of a cable used by the system of FIG. 1.

Referring to FIG. 7, the cabling 108 is designed to function with a cable coupler (described below) of each antenna segment 106. The cabling 108 comprises a high quality dielectric 114, a center conductor 116, and an outer shield 118. The dielectric 114 does not dissipate RF energy between the center conductor 116 and outer shield 118. Notably, a high quality dielectric propagates at a higher relative velocity than low quality dielectrics. Also, a high quality dielectric exhibits lower group envelope delay for a multi-tone modulated signal (group velocity). The characteristic impedance of a coaxial line is given by the equation:

$$Zo = (60/\epsilon^{1/2}) 10 \ g_e(D/d) \qquad [2]$$

where $\epsilon$ is the dielectric constant of the insulating material, i.e., the ratio of the propagation velocity in the material to the propagation velocity in free space. In free space, the propagation velocity is the speed of light or 2.99 E+8 meters per second or 30 cm per nanosecond. Thus, in air, the dielectric constant is 1, d is the center conductor diameter, and D is the distance from the inner surface of the shield 118 to the outer surface of the center conductor 116. The radio of D/d may vary between 3 and 5, while the dielectric constant C may vary by material from 0.6 to 0.8.

Figure 8:
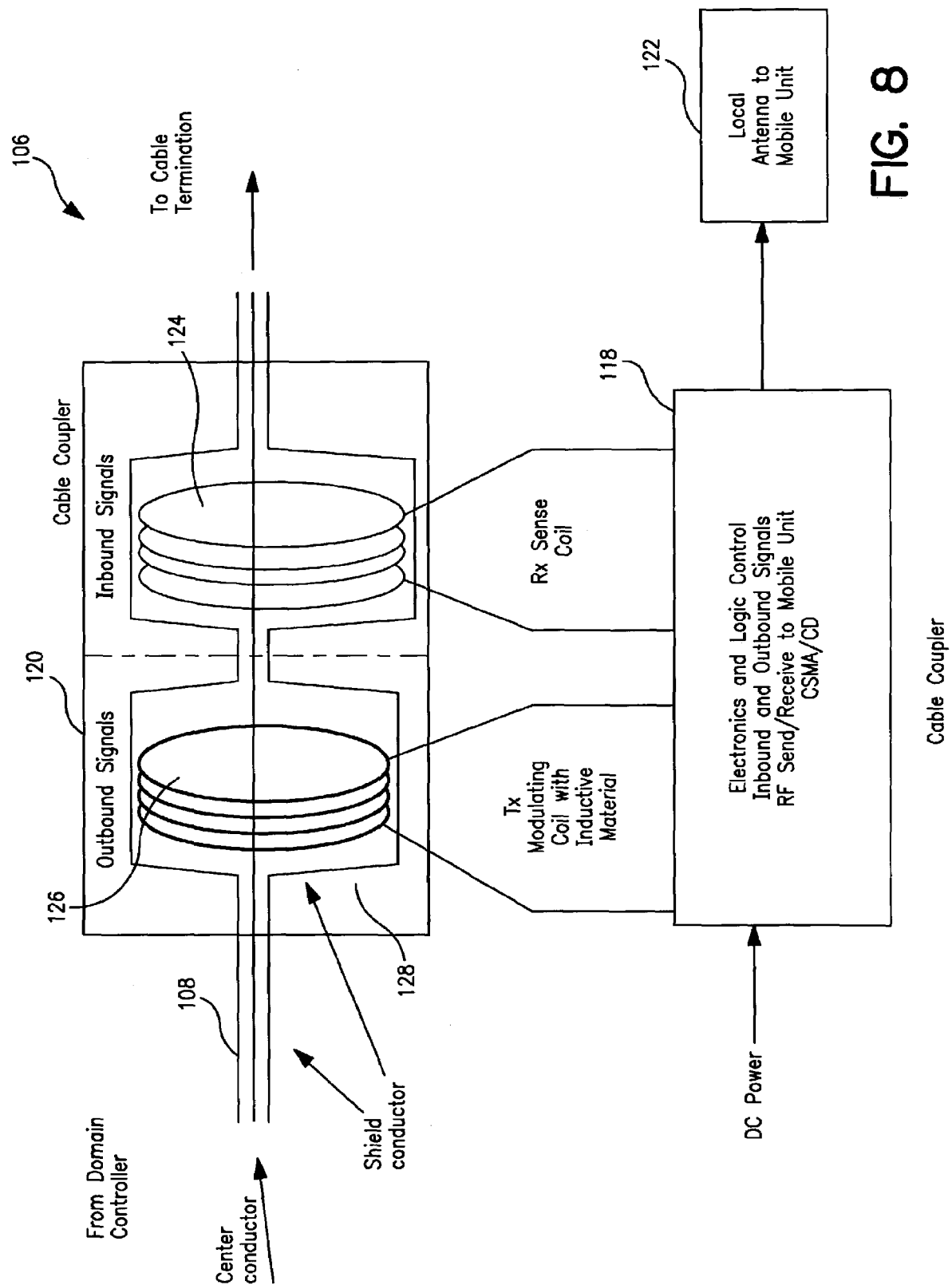
FIG. 8 is a block diagram of one exemplary embodiment of an antenna segment used by the system of FIG. 1.

Referring to FIG. 8, each antenna segment 106 comprises electronic circuitry 118, a cable coupler 120, and a local antenna 122. The cable coupler 120 is a device that couples RF energy between the cabling 108 and the electronic circuitry 118 without electrical contact. The cable coupler 120 comprises two windings: a sensing coil 124, which is designed to read or couple energy from the cabling 108 to the electronic circuitry 118, and a transmission coil 126, which is designed to modulate the carrier signal in the cabling 108 directly. The cable coupler 120 further comprises a center conductor 116 that passes through the coils 124 and 126, and a shield 128 that is disposed around the windings 124 and 126 to match impedance and prevent signal loss from radiation. The impedance of the cable coupler 120 is designed to match incoming and outgoing impedance with the cabling 108. From the standpoint of electrical design, it will have the same effect as if the cabling 108 went through the cable coupler 120.

If any of the modulated carrier signals are present on the cabling 108, the sensing coil 124 will pull in some of the energy, and send it to the signal receiving portion of the electronic circuitry 118. The sensing coil 124 also senses collisions on the cabling 108, and will send them on to the receiving portion of the electronic circuitry 118. If the collision is self-generated, the logic will use a Collision Sense Multiple Access with Collision Avoidance (CSMA/CD) method and protocol to reset itself.

The transmission coil 126 uses a magnetic material to introduce inductive impedance at a point on the cabling 108. This magnetic material is shaped to the wire loop surrounding the center conductor 116. There are a number of ways it may be shaped to the wire loop. By way of example, a simple and effective method is to wrap magnetic quarter inch audiotape around a length of solid copper wire, such as #12. The plastic insulation remains on the wire and the audiotape goes over the plastic insulation. The tape should be wrapped with overlapping loops so a continuous magnetic envelope develops over the wire. This becomes the modulating coil.

Figure 9:
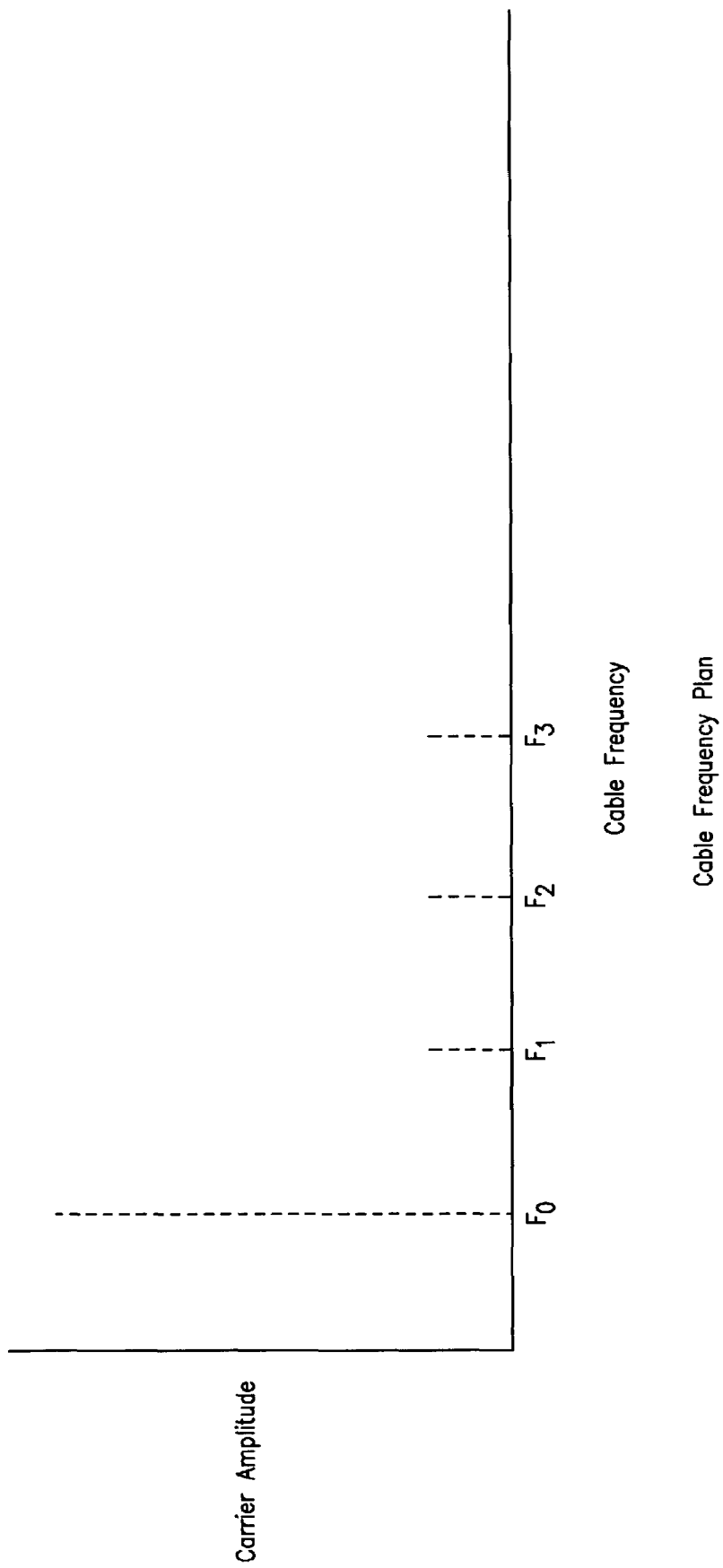
FIG. 9 is a diagram of a cable frequency plan that may be used by the antenna controller and antenna segments of the system of FIG. 1 to communicate with each other.

The geometry is chosen to match impedance with the cabling 108 from the antenna controller 104. In the equivalent circuit of a transmission line, there is capacitance, reactance, and resistance. The cable coupler 120 has a variable inductive property to it that is used to modulate a portion of the carrier signal. The variable inductive property is modulated by the data to return back to the antenna controller 104. The transmission coil 126 effectively adds a lump reactance whose reactance value depends on the instantaneous current in the transmission coil 126. As the current varies, the reactance changes. This varying reactance pushes and pulls part of the carrier energy in the cabling 108. The effect is some level of FM modulation in the $F_0$ carrier. The frequency and level of current in the transmission coil 126 are selected to modulate a small portion of energy distinctly from other antenna segments 106 on the same cabling 108. This way, some number of other antenna segments 106 may communicate with the antenna controller 104 at the same time without collision. After modulation, $F_1$, exists at some level below $F_0$, as shown in FIG. 9. Antenna segments 106 may share the same frequency or have distinct frequencies.

It should be noted that the level of modulation is important. Too much and there will not be enough remaining RF energy for the remaining antenna segments 106. The antenna segments 106 can be ordered by the antenna controller 104 to vary the modulation frequency according to a predetermined plan, so that more than one antenna segment 106 can send signals down the line at the same time.

Figure 10:
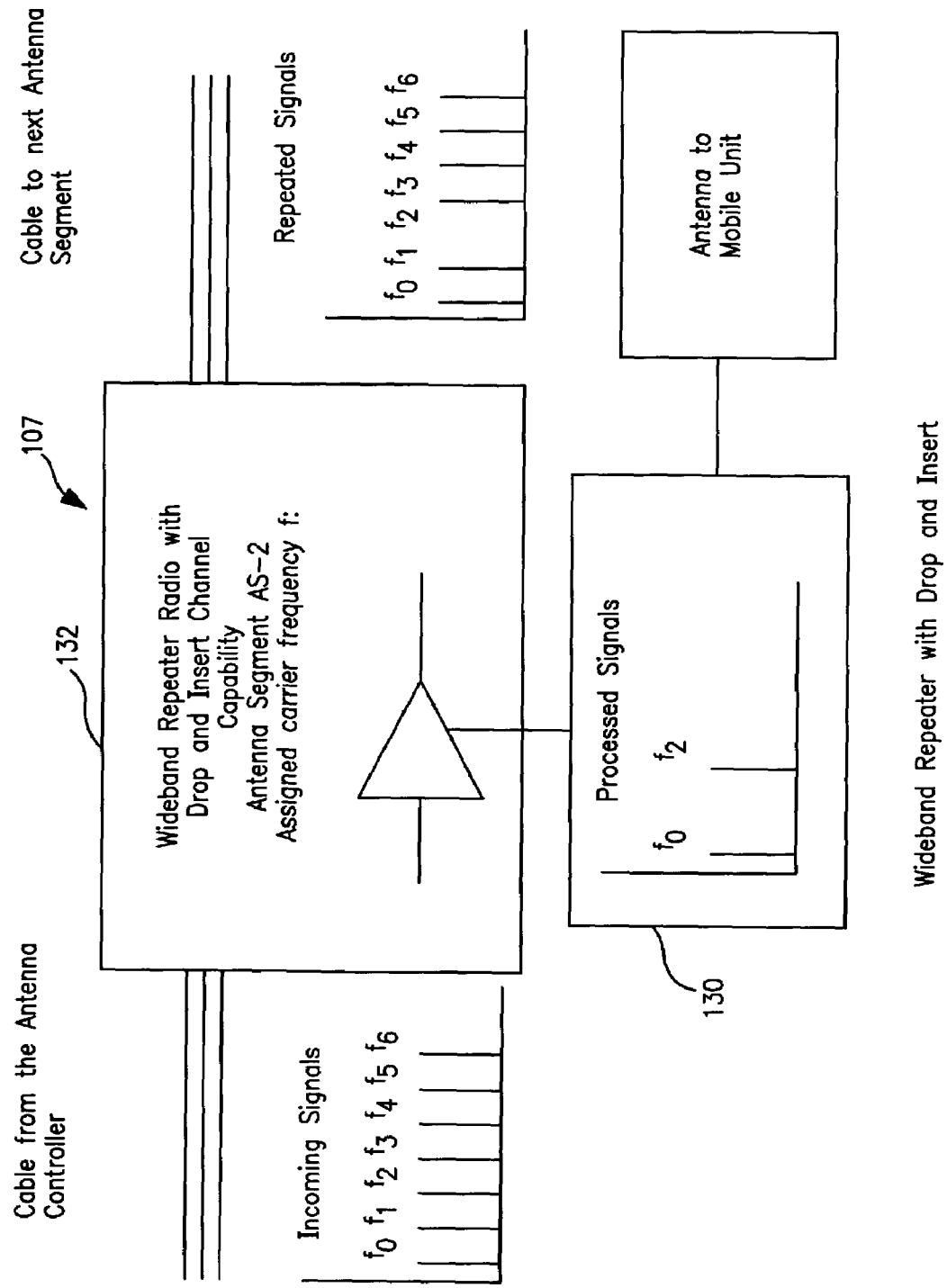
FIG. 10 is a block diagram of another exemplary embodiment of an antenna segment used by the system of FIG. 1.

By way of another example, an antenna segment 106 may be designed without coils by using only electronics and a wideband radio repeater based protocol approach. FIG. 10 shows a block diagram of an antenna segment 107 using only electronics. In this example, the cabling 108 from the antenna controller 104 terminated into the first antenna segment 107. An electronic circuit 130 decodes the modulation. The packet address is examined. If the address belongs to another antenna segment 107, the packet is retransmitted by a radio repeater 132 on to the next antenna segment 107 down the cabling 108. This approach introduces a time delay due to the decoding and recoding pass through packets.

Another example makes use of the FIG. 9 frequency plan. In this plan, the frequency $f_0$ is the same amplitude as the other carriers. Each antenna segment 107 is assigned a carrier frequency $f_1$, through $f_x$, and the antenna controller has the $f_0$ frequency. As illustrated in FIG. 10, the wideband repeater radio 132 uses a drop and insert technique to slot out the frequency of interest. The $f_0$ frequency is used to send a packet to any antenna segment 107. All antenna segments 107 listen in on $f_0$ to see if any packets were addressed to them. The antenna controller 104 listens to all frequencies. The antenna controller 104 can communicate to an antenna segment 107 on one of two channels. It can communicate on the $f_x$ channel assigned to a specific antenna segment 107, as well as the $f_0$ frequency.

The main carrier signal $f_0$ from the antenna controller is always repeated to the next antenna segment 107. It is also dropped out for processing. Since addressing information is in the packet, the antenna segment 107 will recognize the packet for further processing. The frequency assigned to the antenna segment, $f_2$ for this example, is dropped out and not repeated onto the next antenna segment 107. The last antenna segment 107 will only see it's own assigned carrier and $f_0$. The last antenna segment 107 will have a termination in place of the outbound cable.

Thus, it has been shown that it is possible to design an in-building RIF communication network designed to perform in-building location-based communications. By building antenna segments that radiate into a predetermined building volume, much like fluorescent lighting illuminates a volume of hallway; the location of a mobile unit can be determined by knowing the logical address of the antenna segment used to pass on the data packet. The logical address is tied into the building grid and column database on the central computer 102. The database is used by a program that sends location specific menus and maps based on the mobile user's selection. The antenna segment has a specific volume that it illuminates and this knowledge is used to provide location-based services.

Figure 11:
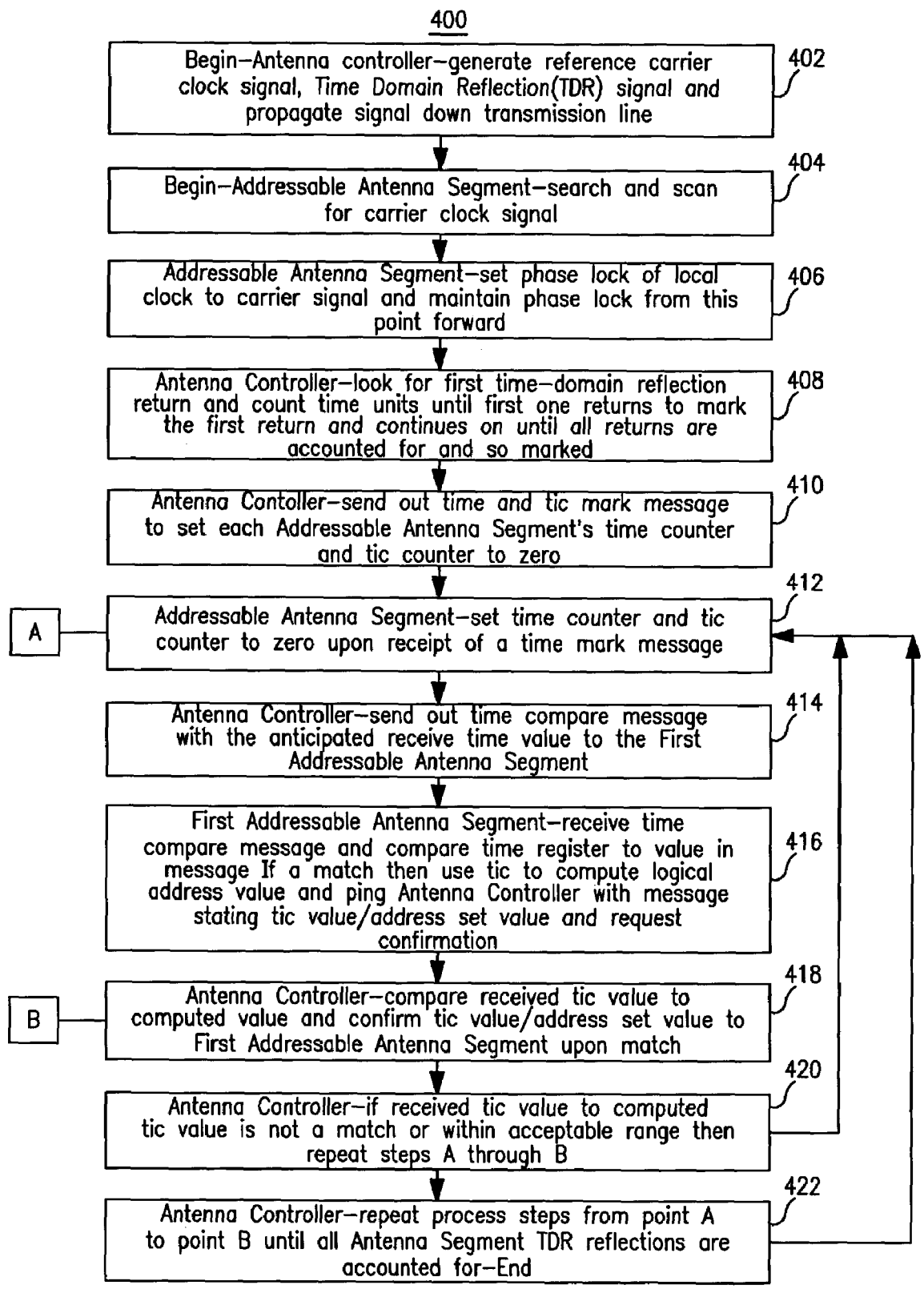
FIG. 11 is a flow chart of a setup protocol.

Referring to FIG. 11, an automatic setup protocol 400 for system 100 (FIG. 1) may use a clock signal embedded in a Time Domain Reflection (TDR) signal upon first-time power-up. This may permit installation of the system without specialized networking skills. In other words, an ordinary electrician may install system 100 by simply laying the cable 108 in the pattern described above. The installer need not be concerned with addressing of individual antenna segments 106. The addressing system is configured automatically by central computer 102 implementing protocol 400. Protocol 400 may for example be followed in conjunction with the auto configuration method illustrated in FIG. 6.

For antenna controller 104, protocol 400 begins at control block 402 with antenna controller 104 generating and propagating reference carrier clock signals and Time Domain Reflection signals. For addressable antenna segments 106, protocol 400 begins at control block 404 with segments 106 searching and scanning for a carrier clock signal.

Next, segments 106 set phase lock to the detected carrier signal at control block 406. Controller 104 listens for the TDR returns from each of segments 106 at control block 408 and counts the time for each return.

Once all the TDR returns are marked, controller 104 sends out time and tic mark messages to each segment 106 at control block 410. Upon receiving that message, each segment 106 sets counters to zero at control block 412.

Next, controller 104 sends out a time compare message with an anticipated receive time value intended for the first segment 106, at control block 414. The first segment 106 receives that message, compares the anticipated value with the actual time register value, and pings controller 104 with an address message stating tic value and requesting confirmation at control block 416. Controller 104 receives the address message at control block 418.

At control block 420, controller 104 determines whether the received tic value indicated in the address message is a match or within an acceptable range. If so, protocol 400 proceeds to control block 422. If not, protocol 400 returns to control block 412 to refine the addressing information.

At control block 422, protocol 400 returns to control block 412 for each segment 106 until all segments 106 are accounted for.

Protocol 400 may be automatically carried out by central computer 102 for system 100 without involvement by the person that installed cable 108 and segments 106. Protocol 400 can be carried out remotely, with no physical access to segments 106.

Figure 12:
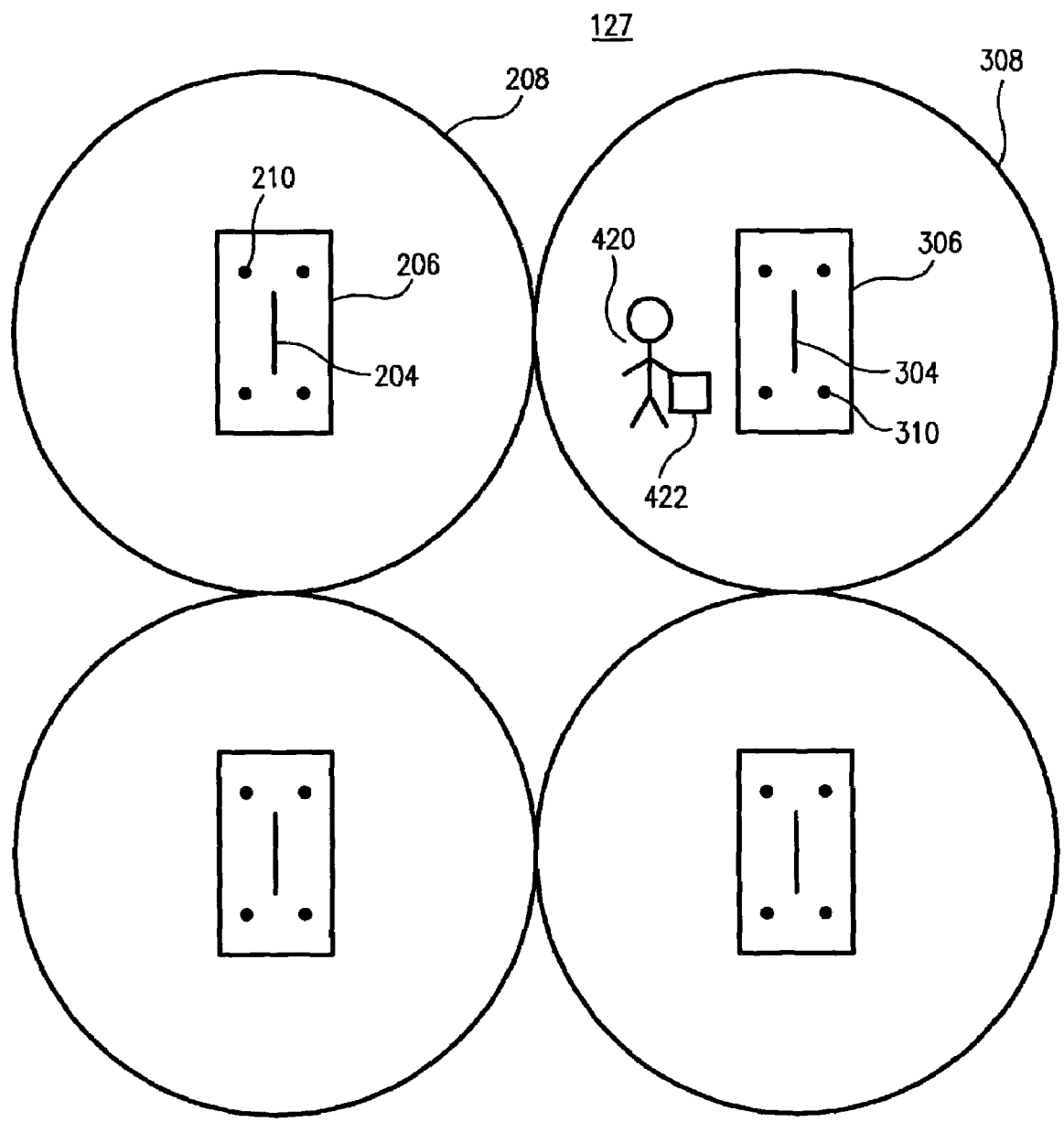
FIG. 12 is a diagram of a system using antenna segments according to the present invention.

Referring to FIG. 12, system 127 includes antenna segments 204 and 304. Various location cues may be provided to user 420 to assist user 420 in correlating the location of mobile unit 422 with fixed points in system 127.

For example, antenna segment 204 may be embedded in light fixture 206 and antenna segment 304 may be embedded in light fixture 306. Radiation pattern 208 represents the volume of space illuminated by light fixture 206. Radiation pattern 208 may also represent the volume of space served by antenna segment 204. Radiation pattern 308 represents the volume of space illuminated by light fixture 306. Radiation pattern 308 may also represent the volume of space served by antenna segment 304. A user 420 carrying mobile unit 422 can observe radiation pattern 308 by viewing the volume of space illuminated by light fixture 306. Having observed radiation pattern 308, user 420 knows that mobile unit 422 is within the space served by antenna segment 304.

Radiation patterns 208 and 308 may alternatively be indicated to user 420 by some means other than light from light fixtures 206 and 306. For example, radiation pattern 208 may be indicated to user 420 by inscription on the floor of a building in which system 127 may be installed. As another example, radiation pattern 308 may be indicated to user 420 by playing sound that may only be heard within radiation pattern 308.

Further cues may be provided to user 420 by indicators 210 and 310. Indicators 210 and 310 may for example be light emitting diodes.

Figure 13:
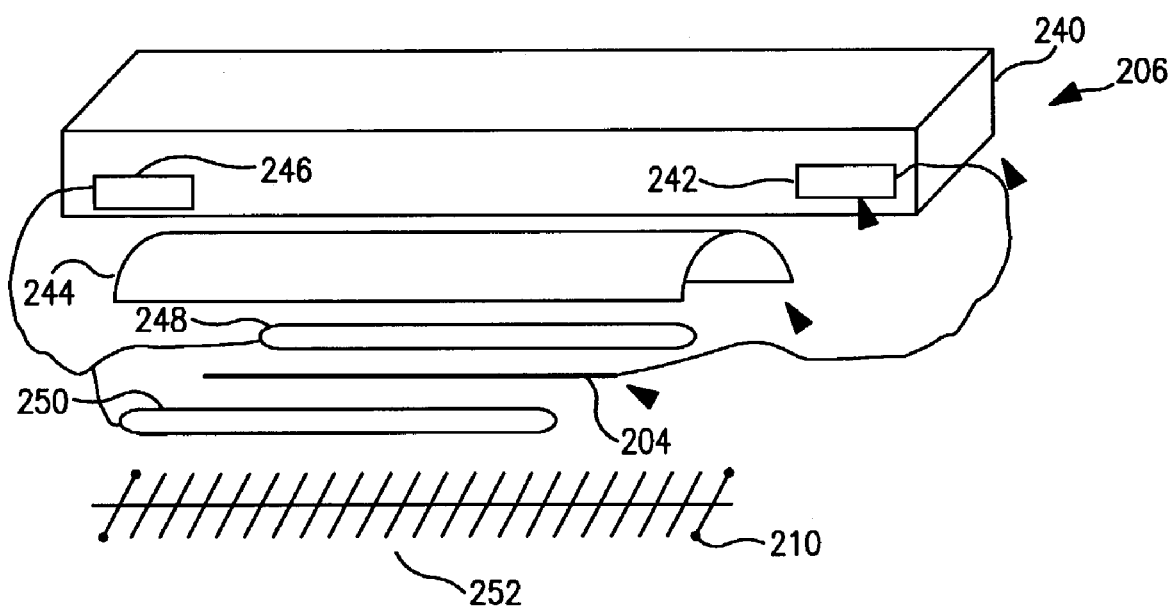
FIG. 13 is an exploded view of a lighting fixture with an embedded antenna segment.

Light fixture 206 may be comprised as shown in FIG. 13. Light fixture 206 is shown comprising light fixture housing 240. Light fixture housing 240 houses antenna segment 204, antenna segment electronics 242, light reflector 244, light fixture power supply 246, fluorescent tubes 248 and 250, and light diffuser 252. Light reflector 244 may be metallic and serve to capture the backside light from fluorescent tubes 248 and 250 and then to redirect that light downward as usable light. Light diffuser 252 then spreads the light (both the direct light and the reflected light) into a pattern of illumination, such as radiation pattern 208. Antenna segment 204 may be embedded in light diffuser 252. Similarly, indicators 210 may be embedded in light diffuser 252.

Light reflector 244 may be made of a material that reflects RF transmissions. In this manner, light reflector 244 may reflect both light and RF radiation, simultaneously serving as a light reflector for fluorescent tubes 248 and 250 and as an RF reflector for antenna segment 204. Antenna segment 204 may be located in the same plane as fluorescent tubes 248 and 250.

Light diffuser 252 may be made of an insulator and be neutral to RF fields. Alternatively, light diffuser 252 may be made of a material that helps direct RF signals to or from antenna segment 204.

Although particular embodiments of the present inventions have been shown and described, it will be understood that it is not intended to limit the present invention to the preferred embodiments, and it will be obvious to those skilled in the art that various changes and modifications may be made without departing from the spirit and scope of the present inventions. Thus, the present invention is intended to cover alternatives, modifications, and equivalents, which may be included within the spirit and scope of the present invention.

What is claimed is:

1. A communication system comprising:
   a plurality of antenna segments configured for generating a respective plurality of antenna patterns, each antenna segment being configured for communicating with a mobile device when the mobile device is within its respective antenna pattern;
   an antenna controller coupled to the plurality of antenna segments, and being configured for determining a sensing antenna segment sensing the mobile device; and
   a computer coupled to the antenna controller, and being configured for determining the location of the mobile device within the system based on the determined antenna segment; and
   means for indicating to a user of the mobile device the extent of an antenna pattern, the means for indicating comprising a light reflector;
   wherein each of the antenna segments is embedded in a light fixture at a fixed location.

2. The system of claim 1 further comprising a metallic reflector configured to reflect visible radiation from a light fixture and invisible radiation from an antenna segment embedded in the light fixture.

3. The system of claim 2 wherein the metallic reflector is configured to reflect the visible radiation in the same pattern as the invisible radiation.

4. The system of claim 1, wherein each of the antenna segments is embedded in a different light fixture at a different physical location.

5. The system of claim 4, wherein each of the different physical locations is located at a different grid point in a defined environment.

6. The system of claim 5 wherein the grid points correlate to a global positioning satellite system.

7. The system of claim 5 wherein the defined environment is a hotel.

8. The system of claim 5 wherein the defined environment is a shopping mall.

9. The system of claim 5 wherein the defined environment is an amusement park.

10. The system of claim 5 wherein the grid is orthogonal.

11. An automatically configurable communication system comprising:
    a plurality of antenna segments configured for generating a respective plurality of antenna patterns, each antenna segment being configured for communicating with a mobile device when the mobile device is within its respective antenna pattern;
    an antenna controller coupled to the plurality of antenna segments, and being configured for determining the sensing antenna segment; and
    a computer coupled to the antenna controller and being configured to implement an automatic address assignment protocol upon initial installation of the communication system, the protocol effective remotely to identify a physical location of each antenna segment using time domain reflection and assign a logical address without physical access to the antenna segments and without pre-assignment of addresses.

12. The system of claim 11 further comprising a plurality of light fixtures located at fixed locations in a building, wherein each antenna segment is embedded in a different one of the light fixtures.

13. The system of claim 12 in which the antenna pattern of each antenna segment is approximately the same as a light pattern emitted from the light fixture in which the respective antenna segment is embedded.

14. A method of automatically assigning addresses in a communication system having a plurality of antenna segments in fixed locations, the method comprising:
    generating in an antenna controller a carrier signal and a time domain reflection signal;
    propagating the carrier signal and the time domain reflection signal from the antenna controller down a fixed transmission line toward antenna segments attached to the line in fixed locations; setting a phase lock of the carrier signal in each antenna segment;

returning different time-domain reflection return signals from each antenna segment to the antenna controller receiving time-domain reflection return signals at different times from respective ones of the antenna segments; and assigning different logical addresses to each of the antenna segments based on the time-domain reflection return signals.

15. The method of claim 14 in which the antenna segments are embedded in a plurality of lighting fixtures.

16. The method of claim 15 in which each antenna segment has an antenna pattern encompassing approximately the same three-dimensional space as a lighting pattern of a lighting fixture in which the antenna segment is embedded.

17. The method of claim 14 in which each antenna segment has an antenna pattern encompassing approximately the same three-dimensional space as the audible range of a signal associated with the respective segment.

18. The method of claim 14, wherein the method is carried out remotely from and without physical access to the antenna segments.

* * * * *

UNITED STATES PATENT AND TRADEMARK OFFICE
CERTIFICATE OF CORRECTION

PATENT NO.       : 7,224,985 B2
APPLICATION NO.  : 10/345283
DATED            : May 29, 2007
INVENTOR(S)      : J. Claude Caci It is certified that error appears in the above-identified patent and that said Letters Patent is hereby corrected as shown below:

Title Page, Item (73) Assignee: Please change "Lockheed Martin, Corp." to --Lockheed Martin Corporation--.

Signed and Sealed this

Tenth Day of July, 2007

JON W. DUDAS
*Director of the United States Patent and Trademark Office*